United States Patent
Mathur et al.

(10) Patent No.: US 11,331,976 B2
(45) Date of Patent: May 17, 2022

(54) HVAC SEALING SURFACE WITH NOISE REDUCTION CONFIGURATION

(71) Applicant: Calsonic Kansei North America, Inc., Farmington Hills, MI (US)

(72) Inventors: Gursaran Das Mathur, Farmington Hills, MI (US); Takenao Kato, Farmington Hills, MI (US); Scott Torok, Farmington Hills, MI (US)

(73) Assignee: MARELLI CABIN COMFORT USA, INC., Shelbyville, TN (US)

( * ) Notice: Subject to any disclaimer, the term of this patent is extended or adjusted under 35 U.S.C. 154(b) by 227 days.

(21) Appl. No.: 16/415,660

(22) Filed: May 17, 2019

(65) Prior Publication Data

US 2020/0361274 A1 Nov. 19, 2020

(51) Int. Cl.
*B60H 1/00* (2006.01)

(52) U.S. Cl.
CPC ..... *B60H 1/00028* (2013.01); *B60H 1/00321* (2013.01); *B60H 1/00864* (2013.01); *B60H 2001/006* (2013.01); *B60H 2001/00092* (2013.01)

(58) Field of Classification Search
CPC ............ B60H 1/00028; B60H 1/00321; B60H 1/00864; B60H 2001/00092; B60H 2001/006; B60H 2001/00707; B60H 2001/00721
USPC ........................................................ 454/262
See application file for complete search history.

(56) References Cited

U.S. PATENT DOCUMENTS

| 2004/0238046 | A1* | 12/2004 | Hoffman | B60H 1/248 |
| | | | | 137/601.08 |
| 2005/0095970 | A1* | 5/2005 | Ito | B60H 1/00678 |
| | | | | 454/69 |
| 2006/0099903 | A1* | 5/2006 | Bowler | F24F 13/1406 |
| | | | | 454/121 |
| 2009/0305623 | A1* | 12/2009 | Lange | B60H 1/00671 |
| | | | | 454/121 |
| 2010/0120348 | A1* | 5/2010 | Tanaka | B60H 1/00678 |
| | | | | 454/159 |
| 2017/0087959 | A1* | 3/2017 | Suzuki | F24F 13/1406 |
| 2019/0061478 | A1* | 2/2019 | Kramer | F24F 13/1406 |

FOREIGN PATENT DOCUMENTS

JP 2004161243 6/2004

* cited by examiner

*Primary Examiner* — Steven B McAllister
*Assistant Examiner* — Charles R Brawner
(74) *Attorney, Agent, or Firm* — Foley & Lardner LLP

(57) ABSTRACT

Disclosed is an HVAC system configured to reduce noise. The HVAC system includes a door having a first and second end. The door includes an elastomer along the first end and a rotatable member adjacent the second end. The elastomer includes a door touch area. The case defines an internal case portion, external case portion, and a case opening fluidly connecting the internal and external case portion. The case is configured to receive the rotatable member of the door such that the door is rotatable about an axis between a first position, where the door covers the case opening, and a second position, where the door does not cover the case opening. The case includes a case touch area with a graining. The door touch area and the case touch area are substantially parallel and in contact along a surface contact area when the door is in the first position.

19 Claims, 12 Drawing Sheets

HVAC SEALING SURFACE WITH NOISE REDUCTION CONFIGURATION

BACKGROUND

The present application relates generally to the field of heating, ventilation, and air conditioning ("HVAC") systems for vehicles.

Conventional vehicles typically include a vehicle body defining a space such as a vehicle cabin within which a user may be positioned. The vehicle may additionally include a cooling and/or heating system (e.g., HVAC system) configured to maintain user comfort during vehicle operation. The HVAC system typically includes a combination of ducts, fans, and flow valves configured to route conditioned air toward different areas within the vehicle cabin. A conventional HVAC system with more than one zone provides air to different portions of the vehicle passenger compartment at different temperatures. In order to provide air at more than one temperature, the HVAC system may be subdivided into different zones by installing a divider inside an HVAC housing and providing separate zones on each side of the divider. Generally, multiple doors are disposed inside the HVAC system to direct airflow to multiple locations in the vehicle passenger compartment. By rotating the door, the volume flow rate of air in each zone is increased or restricted by some amount.

Each door may include an elastomer along one or more sides of the door to facilitate sealing between one-side of the door and the case to restrict any air leakage to the other side. The edges of the elastomer are smooth to facilitate sealing between the case and the door, but the smooth elastomer edge sticks to the surface of the case. For example, when a door moves from one position to another (e.g., from closed to open), there is relatively high friction between the elastomer door and the case at the initial movement. Specifically, as the door beings to open (usually due to an actuator causing the door to rotate) the edge of the elastomer that is touching the inside of the case may stick and produce a noise that may be audible within the vehicle compartment.

It would be advantageous to provide and improved HVAC system that addresses the foregoing issues. These and other advantages will be apparent to those reviewing the present disclosure.

SUMMARY

At least one embodiment relates to a heating, ventilation, and air conditioning ("HVAC") system. The HVAC system includes a door and a case. The door has a first end and a second end. The door includes an elastomer along the first end and a rotatable member adjacent the second end. The elastomer includes a door touch area. A case defines an internal case portion, an external case portion, and a case opening fluidly connecting the internal case portion and the external case portion. The case is configured to receive the rotatable member of the door such that the door is rotatable about an axis between a first position where the door covers the case opening and a second position where the door does not cover the case opening. The case includes a case touch area with a graining. The door touch area and the case touch area are substantially parallel and in contact along a surface contact area when the door is in the first position.

Another embodiment is an HVAC system. The HVAC system includes at least one door and an HVAC case. The HVAC case defines a case opening and a case touch area adjacent the case opening. The at least one door is disposed in the HVAC case. The at least one door is rotatable between a first position in which the at least one door covers the case opening and a second position in which the at least one door does not cover the case opening. The at least one door includes an elastomer. The elastomer defines a first end and a second end. The elastomer includes a door touch area extending from the first end toward the second end. The elastomer is angled from the first elastomer end toward the second elastomer end such that the door touch area contacts the case touch area along a surface contact area when the at least one door is in the first position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Referring to the Figures generally, an HVAC system with a noise reducing surface is shown, according to various exemplary embodiments. The term "HVAC system" is being used to refer generally to systems which deliver air in a vehicle and are configured to control the temperature of the air. Further, it should be understood that the HVAC system may be configured as a heater without an evaporator, an evaporator without a heater, or with both a heater and an evaporator according to various exemplary embodiments. In some embodiments, a door touch area of the case includes a grained surface that is configured to contact the elastomer of the door and reduce the frictional force between the elastomer (e.g., the door) and the case. Beneficially, graining or roughing the touch area of the case in a particular patterns or orientation reduces the effective contact area (e.g., surface contact) between the elastomer of the door and the case, thereby reducing the force required to move the elastomer from the case as the door rotates between a closed to an open position. The reduction in inertial force will decrease potential energy build up in the transition of the door opening, thereby reducing noise output from the case.

Figure 1:
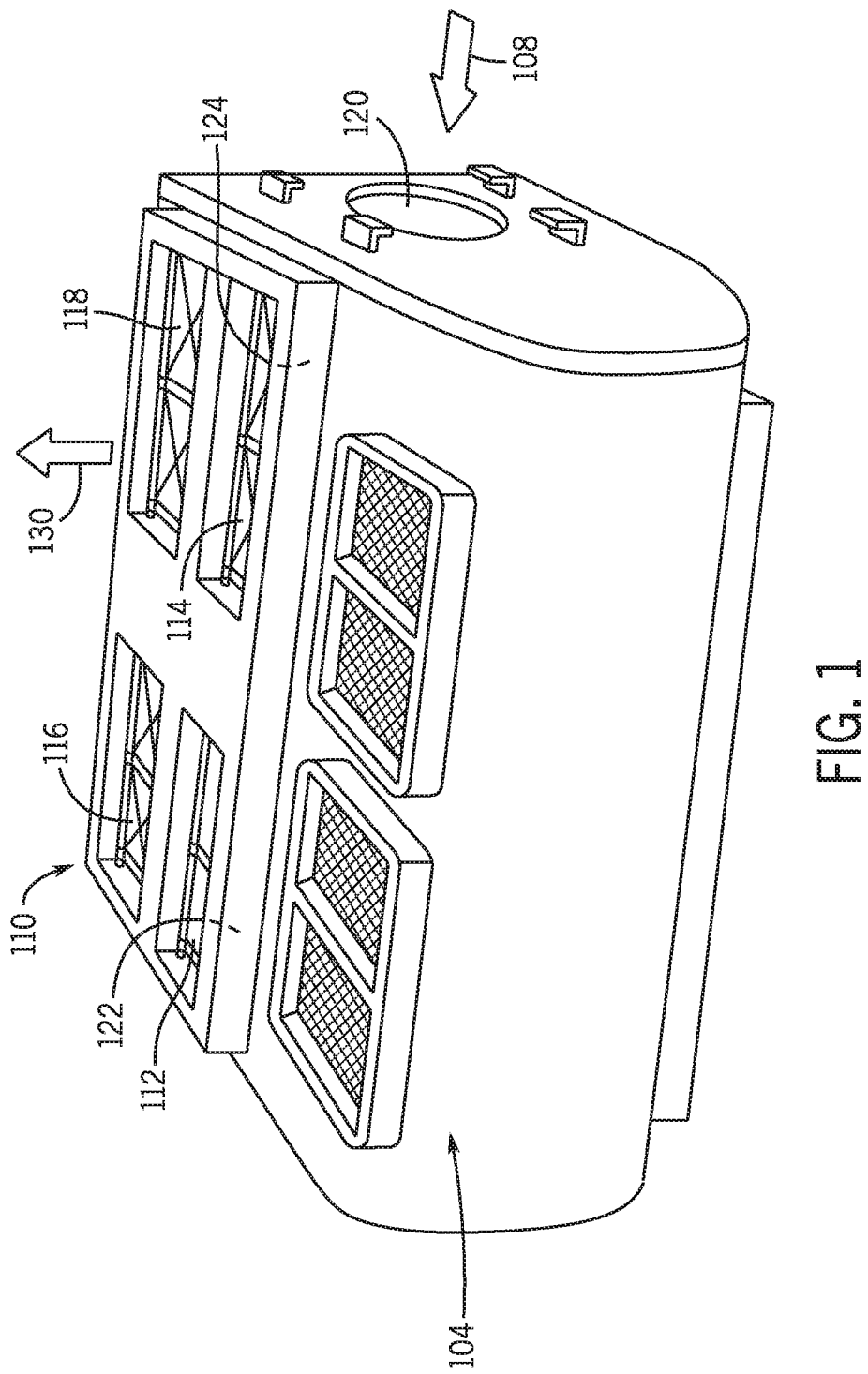
FIG. 1 is a perspective view of an HVAC system, according to an exemplary embodiment.

Referring now to FIG. 1, a perspective view of an HVAC system 100 is shown according to an exemplary embodiment. The HVAC system 100 may include an HVAC case 102 and a plurality of doors 110. The case 102 includes an input end 120 and an output end 130 and an internal cavity 104 formed therewithin. In some embodiments, the case 102 is formed from at least two components, including a first (i.e., lower, rear, etc.) shell and a second (i.e., upper, forward, etc.) shell disposed on and engaging the first shell such that corresponding edges of the first shell and the second shell may define substantially the same outer profile at an edge where they meet, such that the edges are configured to align and/or mate with each other. The case 102 may be formed by using an injection molding process with a polypropylene material that is 20% talc filled. The internal cavity 104 may include one or more HVAC components. In some embodiments, a blower, an evaporator, and/or a heater are disposed within the internal cavity 104 of the case 102. The evaporator may be configured to cool air passing therethrough. The heater may be configured to heat the air and outputs a heated air stream. The blower may include an electric motor coupled to a fan cage having a plurality of blades arranged in a cylindrical orientation and configured to rotate about a blower axis to move air 108 from the input end 120 to the output end 130. During operation, the fan cage draw air external to the case 102, through the input end 120 and into the case 102 for cooling and passing through ducts, as will be discussed in further detail below. The volume flow rate of air in the HVAC system 100 may be controlled by adjusting the rotational speed of the blower.

The HVAC system 100 is a multi-zone system with a plurality of doors 110 configured to deliver conditioned air to a different region (e.g., portion, area, part, etc.) of the vehicle cabin. As shown in FIG. 1, the plurality of doors 110 of the HVAC system 100 includes a first door 112, a second door 114, a third door 116, and a fourth door 118. Each of the first door 112, the second door 114, the third door 116, and the fourth door 118 are configured to have an open position and a closed position and may be tailored for thermal comfort and safety aspects. In the open position, air 108 flows from the internal cavity 104 to the output end 130 through the open door, where the air 108 may flow through one or more conduits to a region (e.g., zone) of the vehicle cabin. In the closed position, each door is in contact with a respective touch surface along the case 102 to form a seal between door and the case 102 and prevent air from leaking from the internal cavity 104 to outside of the case 102. In some embodiments, an actuator is configured to transition the first door 112, second door 114, third door 116, and/or fourth door 118 between the closed and open positions. In some embodiments, one of the doors in the plurality of doors 110 could be configured to open and provide conditioned air (e.g., direct airflow) to a defrost and side de-mister zone; a foot level defrost and de-mister zone; one or more vehicle passenger compartment vents and/or panels zone(s); one or more foot vehicle passenger compartment vents and/or panels zone(s); or a rear mode zone. Additionally, a door in the plurality of doors 110 may be disposed on a blower unit and configured to facilitate airflow to the HVAC unit from the outside or from the vehicle passenger compartment (e.g., re-circulation mode). In some embodiments, a door is configured to extend between an evaporator and a heater.

According to an exemplary embodiment, the HVAC system 100 may be provided in a first condition for providing air to two zones. In this configuration, the first door 112 may be oriented in a fully open position or a position between the fully open position and the closed position (e.g., a partially-open position) such that the first door 112 is not in contact with a first touch area 122 (or any other area) of the case 102. The second door 114 is oriented in the closed position, such that the second door 114 seals against a second touch area 124 of the case 102 and prevents air from flowing therethrough to a second conduit. In this configuration, air may only pass through the first door 112, to a first conduit or similar element, in the space between the first door 112 and the first touch area 122 of the case 102. As will be appreciated, the volume flow rate in the zone in fluid communication with the first door 112 through the first conduit may further be controlled by changing the position of the first door 112 and/or changing the rotational speed of the blower.

A passenger may desire to have air flow to the second zone in fluid communication with the second conduit and may initiate the opening of the second door 114, for example, by engaging a control on a control panel in the vehicle cabin. Unlike conventional HVAC systems, the second touch area 124 of the case 102 is grained such that when the second door 114 begins to move from the closed position to the open position, the effective contact area between the second touch area 124 of the case and the touch area of the second door 114 is minimized to reduce the inertial force required to release the touch area of the second door 114 from the second touch area 124. In other words, the rough surface of a grained second touch area 124 minimizes the build-up of energy and bend of the second door 114 (e.g., orientation of the proximal end of the touch surface of the second door 114 in relation to the distal end of the second door 114), such that the release of energy as second door 114 is released from the second touch surface 124 is minimized compared to conventional HVAC cases. As less energy is released, less noise is generated, resulting in a more pleasant experience for the passenger(s) in the vehicle cabin. In some embodiments, the touch area of the second door 114 is grained or altered instead of the second touch area 124. In other embodiments, both the touch area of the second door 114 and the second touch area 124 are grained. The interaction between the grained area(s) of the door and case 102 are described in greater detail below.

Figure 2:
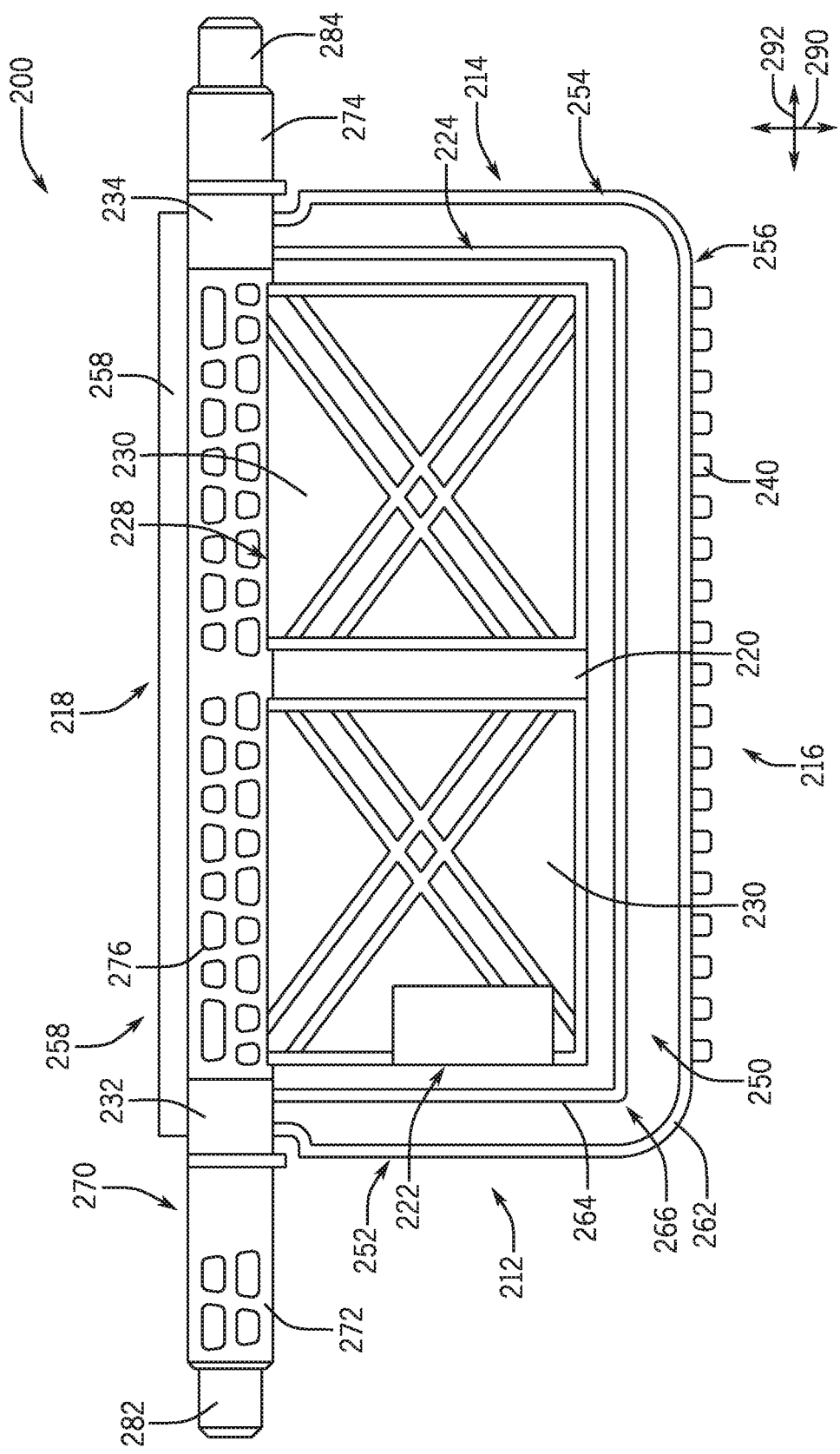
FIG. 2 is a top view of an HVAC door of the HVAC system of FIG. 1, according to an exemplary embodiment.
Figure 3:
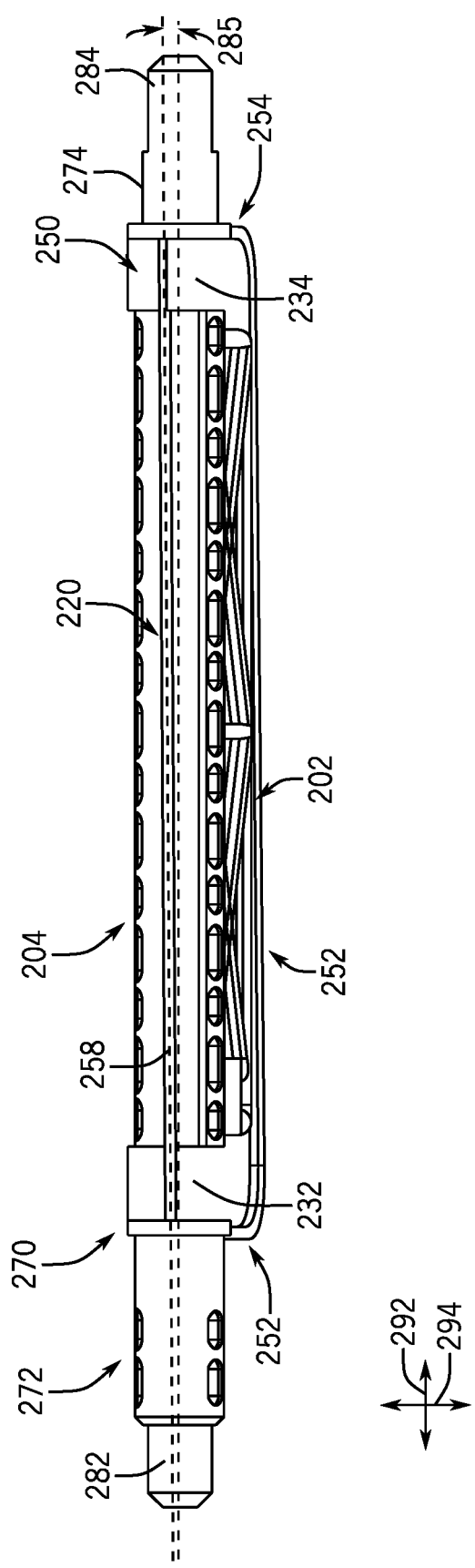
FIG. 3 is a rear view of the HVAC door of FIG. 2.

Referring to FIGS. 2 and 3, a door 200 is shown, according to an exemplary embodiment. The door 200 may be one of the doors in the plurality of doors 110 of the HVAC system 100 of FIG. 1. The door 200 includes a first door surface 202 and a second door surface 204 disposed away from and the first door surface 202 along the normal axis 294 and mirrored about a longitudinal axis 292. When the door 200 is installed within the case 102, the first door surface 202 is positioned toward the case 102 and the second door surface 204 is positioned toward the output end 130. The door 200 defines a first end 212, a second end 214 positioned away from the first end 212 along the longitudinal axis 292, a third end 216, and a fourth end 218 positioned away from the third end 216 along the lateral axis 290. The door 200 includes a door body 220, an elastomer 250, and a rod portion 270. FR The rod portion 270 is configured to rotatably engage with a portion of the case 102 to allow the door 200 to rotate between a closed position to an open position. The rod portion 270 includes a middle rod portion 276, a first rod end 272, and a second rod end 274 that is disposed longitudinally away from (e.g., along the longitudinal axis 292) from the first rod end 272. The first rod end 272 includes a first bore 282 that is configured to be received by a complementary boss end in the case 102. The second rod end 274 includes a second bore 284 that is configured to be received by a complementary boss end in the case 102. In some embodiments, the first rod end 272 is longer than the second rod end 274 to orient the door 200 within the case 102 to ensure that the case touch area contacts the elastomer touch area at a surface contact area.

The door body 220 defines a first body end 222, a second body end 224 positioned away from the first body end 222 along the longitudinal axis 292, a third body end 226, and a fourth body end 228 positioned away from the third body end 226 along the lateral axis 290. The fourth body end 228 is formed with the middle rod portion 276. As shown in FIG. 2, the door body 220 includes a pair of flaps 230 that are configured to facilitate sealing between the door 200 and the case 102 and facilitate air 108 flow past the open door 200. In some embodiments, the door body 220 is formed using a polypropylene with a 40% glass fill.

The elastomer 250 surrounds the periphery of the door body 220 and the middle rod portion 276. The elastomer 250 defines a first elastomer end 252, a second elastomer end 254 positioned away from the first elastomer end 252 along the longitudinal axis 292, a third elastomer end 256, and a fourth elastomer end 258 positioned away from the third elastomer end 256 along the lateral axis 290. The elastomer 250 includes an outer first edge 262 and an inner second edge 264 spaced inwardly from the first edge 262 along the first elastomer end 252, the second elastomer end 254, and the third elastomer end 256. Each of the first edge 262 and the second edge 264 extend in the axial direction from the first door surface 202 to the second door surface 204 such that an elastomer channel 266 is formed. The elastomer 250 includes a first rod elastomer portion 232 and a second rod elastomer portion 234 extend over the rod portion 270 to the fourth elastomer end 258. In some embodiments, the fourth elastomer end 258 includes first edge and a second edge that extend in the axial direction. In other embodiments, the fourth elastomer end 258 is a single strip of elastomer 250 along the middle rod portion 276. The elastomer 250 may be a viscoelastic (e.g., sticky) and/or elastic polymer. In some embodiments, the elastomer 250 is overmolded on the door body 220 and rod portion 270. In some embodiments, the elastomer 250 has a Shore hardness of 35. In other embodiments, the elastomer 250 has a Shore hardness of 45, which provides greater noise reduction than an elastomer 250 with the Shore hardness of 35.

As shown in FIG. 2, a plurality of ridges 240 are formed along the third elastomer end 256. In some embodiments, the plurality of ridges 240 are configured to be a door touch area configured to contact a case touch area at a surface contact area. Because the surface area(s) of the elastomer 250 are smooth, a wide range of surface areas along the first elastomer end 252, second elastomer end 254, third elastomer end 256, and fourth elastomer end 258 may be configured to contact a case touch area to form a seal along a surface contact area between the touch areas. The elastomer 250 is flexible that helps in restricting any air leakage from the first door surface 202 (e.g., high pressure side) to the second door surface 204. In some embodiments, an end of the door 200 may be configured to match a case 102 draft. In other embodiments, the elastomer 250 is angled with respect to the axis (e.g., lateral axis 290) toward the rotation direction of the door 200 such that the elastomer 250 gradually contacts a case touch area from an end of the elastomer 250 toward the flap 230 of the door. In some embodiments, the elastomer is angled (e.g., angle 285 in FIG. 3) from the first elastomer end toward the second elastomer end.

Figure 4:
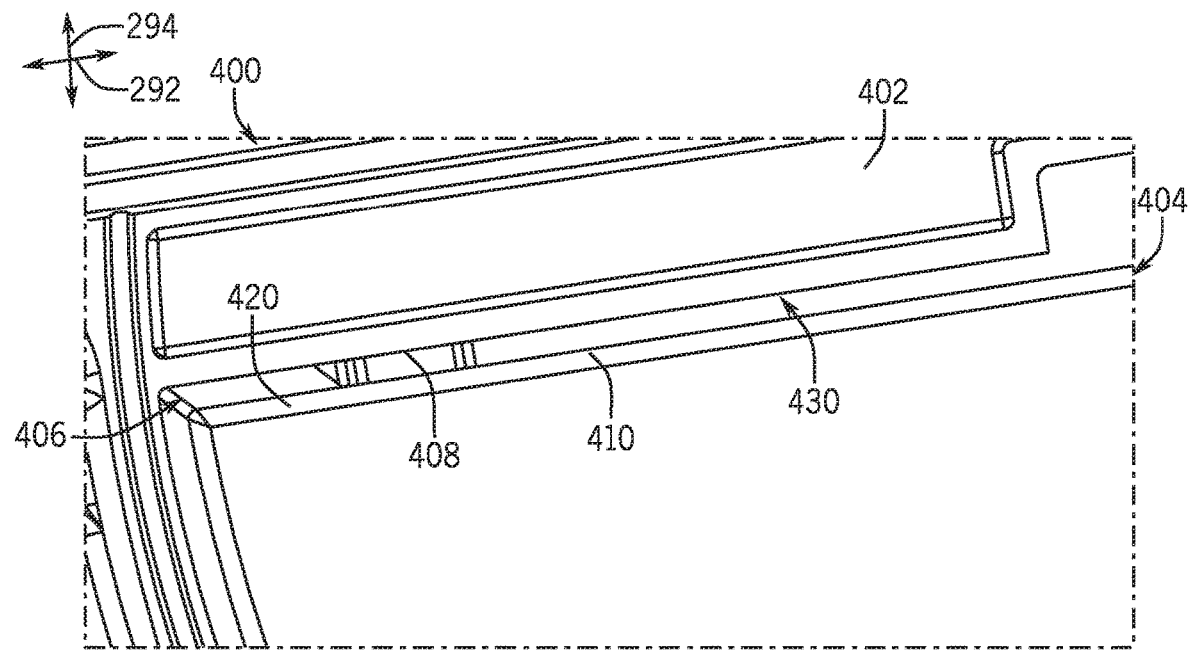
FIG. 4 is a side view of a portion of an HVAC case of the HVAC system of FIG. 1, according to an exemplary embodiment.

Turning to FIG. 4, a portion 400 of the case 102 is shown, according to an exemplary embodiment. The body 402 includes a door wall 404 configured to receive a door, for example, the door 200 of FIGS. 2 and 3. The door wall 404 defines a first wall end 406, a second wall end 408 that extends perpendicularly from the first wall end 406, and a third wall end 410 that extends perpendicularly from the first wall end 406 and is parallel to the second wall end 408. A wall cavity 430 is formed between the second wall end 408 and the third wall end 410 and is configured to allow air 108 to flow from the internal cavity 104 toward the output end 130. A case touch area 420 is defined between the second wall end 408 and the third wall end 410 and between the first wall end 406 and the wall cavity 430. The case touch area 420 is configured to be contacted by a door touch area to form seal between the door 200 and the case 102 to obstruct any air leakage to the other side when the door 200 is in the closed position. The door wall 404 may be formed using an injection molding process with polypropylene as the base material with a 20% talc fill. In some embodiments, the surface finish of the case touch area 420 and/or door wall 404 is with a smooth PP20 material.

Figure 5:
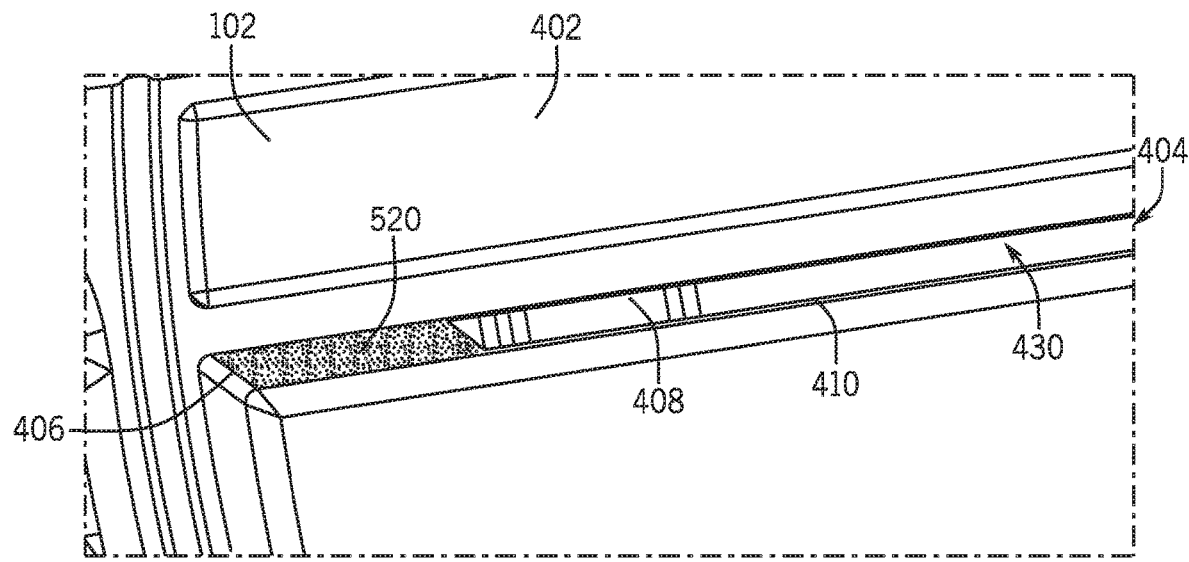
FIG. 5 is a side view of the portion of the HVAC case of FIG. 4 with a noise reducing surface, according to an exemplary embodiment.

Turning to FIG. 5, the portion 400 of the case 102 is treated along the case touch area 420 to alter the surface properties to form the grained case touch area 520. The grained case touch area 520 is configured to reduce the frictional force between the elastomer 250 and the grained case touch area 520. The grained case touch area 520 may have a grain size for creating a surface roughness between 100 to 300 microns. The grains along the grained case touch area 520 may be horizontal, as described in greater detail below in FIGS. 11 and 12, vertical, as described in greater detail below in FIGS. 14 and 15, or a combination of parallel and non-parallel grains. The grains may be formed by sanding a case touch area 420 with a roughening element having a particle size of 269 microns or 0.01014 inches along the case touch area 420 to form the grained case touch area 520. In some embodiments, the grains may be formed by sanding a case touch area 420 with a roughening element having a particle size of 82 microns or 0.003091 inches along the case touch area 420 to form the grained case touch area 520. In some embodiments, the roughening element may be sandpaper having a P60 grit or a P180 grit. The roughened grained case touch area 520 decreases the surface contact area between the door touch area and the grained case touch area 520.

Figure 6:
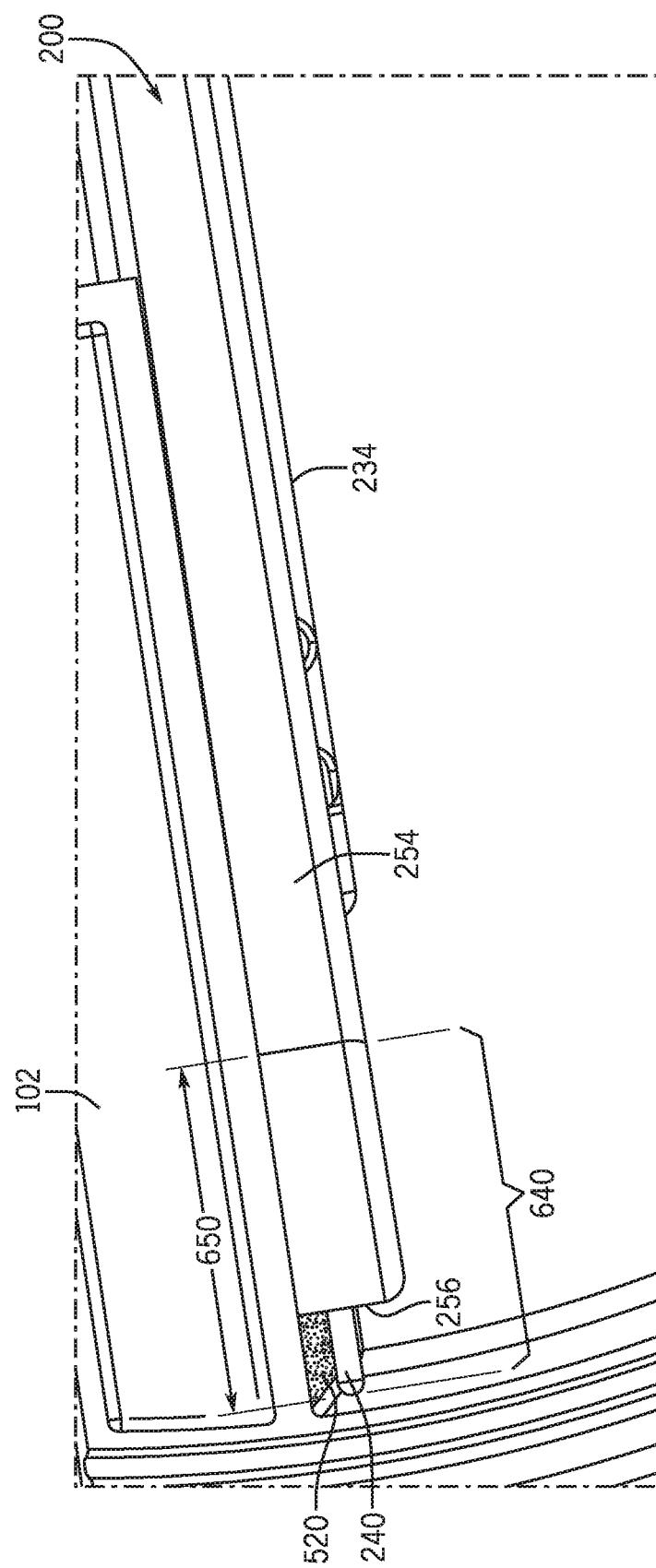
FIG. 6 is a side view of the portion of the HVAC case of FIG. 5 with the HVAC door of FIG. 2 installed within, according to an exemplary embodiment.

Referring to FIG. 6, the door 200 of FIG. 2 is installed within the portion 400 of the case 102. In the closed position, the plurality of ridges 240 and the first edge 262 and elastomer channel 266 of the third elastomer end 256 form the door touch area 640 that is in contact with the grained case touch area 520 at the surface contact area 650. While the grained case touch area 520 reduces the coefficient of friction between the grained case touch area 520 and the door touch area 640 (compared to a smooth case touch area and door touch area), the sealing between the door 200 and the case 102 is not affected. As the door 200 transitions to the open position, the rod portion 270 rotates clockwise (e.g., from the third end 216 toward the fourth end 218) causing the third elastomer end 256 to be raised from the grained case touch area 520. As the fourth end 218 of the door 200 moves upward along the normal axis 294, the third end 216 moves downward along the normal axis 294 causing a bend along the door 200 and the storage of energy. Initially, the elastomer of the third elastomer end 256 does not move due to friction. However, because the roughness of the grained case touch area 520 reduces the surface contact area 650 between the grained case touch area 520 and the door touch area 640, a reduced force is required to move (e.g., detach) the elastomer of the third elastomer end 256 from the grained case touch area 520 of the case 102. In some embodiments, the reduction of the coefficient of friction between the grained case touch area 520 and the door touch area 640 (compared to a smooth case touch area and door touch area) reduces the noise of the door 200 moving from the closed position to the open position by more than 5 dBA.

As shown in FIG. 6, the door touch area 640 is a wide area of contact that is substantially flat. Similarly, the grained case touch area 520 is wide area of contact that is substantially flat. Accordingly, because the surfaces that are touching—the grained case touch area 520 and the door touch area 640—are substantially parallel and have a wide area of surface contact area 650, the case 102 with the noise reducing surface provides greater contact area than conventional HVAC cases while providing, due to graining as described in greater detail below, a reduced force is required to move (e.g., detach) the elastomer 250 from the case 102. Specifically, the wide surface contact area 650 formed from the substantially parallel grained case touch area 520 and the door touch area 640 provides more contact area, and therefore sealing, than round case portions that contact flat doors or rounded doors that contact flat case surfaces with narrow surface contact area (e.g., surface tangential to the rounded portion).

Figure 7:
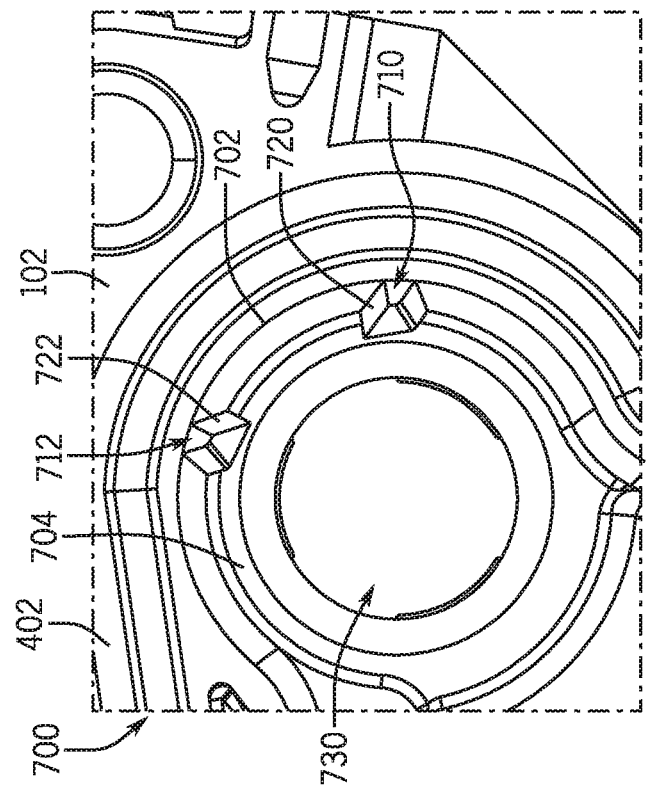
FIG. 7 is a side view of a portion of an HVAC case of the HVAC system of FIG. 1, according to an exemplary embodiment.

Referring to FIG. 7, a portion 700 of the case 102 is shown, according to an exemplary embodiment. The portion 700 may be an opposite end of the body 402 of the portion 400 shown in FIGS. 4-6. The body 402 includes a curved portion 702 and a first boss portion 704. The first boss portion 704 forms a first boss cavity 730 configured to receive a first bore 282 of the rod portion 270 of a door, for example, the door 200 of FIGS. 2 and 3. The curved portion 702 includes a first notch 710 and a second notch 712 disposed counterclockwise from the first notch 710. The first notch 710 includes a first notch touch surface 720 configured to contact the fourth elastomer end 258 when the door 200 is in a closed position. The first notch touch surface 720 is configured to be contacted by fourth elastomer end 258 to form a seal between the door 200 and the case 102 to restrict any air leakage to the other side when the door 200 is in the closed position. The second notch 712 includes a second notch touch surface 722 configured to contact the fourth elastomer end 258 when the door 200 is in a fully open position. The second notch touch surface 722 is configured to be contacted by fourth elastomer end 258 to form a seal between the door 200 and the case 102 to obstructs any air leakage to the other side when the door 200 is in the open position.

Figure 8:
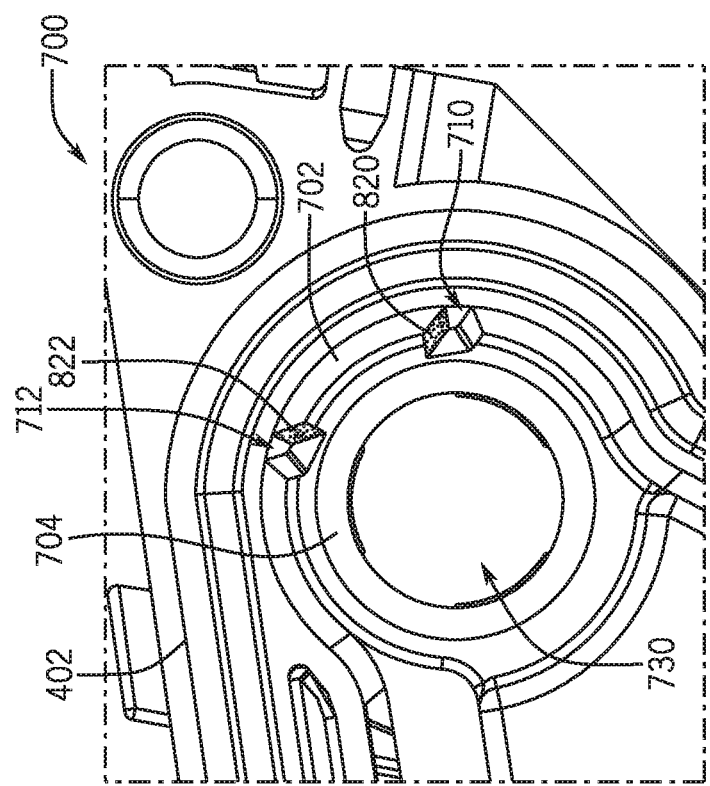
FIG. 8 is a side view of the portion of the HVAC case of FIG. 4 with a noise reducing surface, according to an exemplary embodiment.

Turning to FIG. 8, the first notch 710 and the second notch 712 are treated along the first notch touch surface 720 and second notch touch surface 722 to alter the surface properties to form a first grained notch touch surface 820 and second grained notch touch surface 822, respectively. The first grained notch touch surface 820 and second grained notch touch surface 822 are configured to reduce the frictional force between the elastomer 250 and the first grained notch touch surface 820 and second grained notch touch surface 822. The first grained notch touch surface 820 and second grained notch touch surface 822 may have a grain size for creating a surface roughness between 100 to 300 microns. The grains along the first grained notch touch surface 820 and/or second grained notch touch surface 822 may be horizontal, as described in greater detail below in FIGS. 11 and 12, vertical, as described in greater detail below in FIGS. 14 and 15, or a combination of parallel and non-parallel grains. The grains are formed along the surface that will contact the other component; the surface of the case that will be in contact with the edge portion of the door and/or the surface of the door that will be in contact with the portion of the case. The grains may be formed by sanding the first notch 710 and/or second notch 712 with a roughening element having a particle size of 269 microns or 0.01014 inches along the first notch 710 and/or second notch 712 to form the first grained notch touch surface 820 and second grained notch touch surface 822, respectively. In some embodiments, the grains may be formed by sanding a first notch 710 and/or second notch 712 with a roughening element having a particle size of 82 microns or 0.003091 inches along the first notch 710 and/or second notch 712 to form the first grained notch touch surface 820 and second grained notch touch surface 822, respectively. In some embodiments, the roughening element may be sandpaper having a P60 grit or a P180 grit. The roughened first grained notch touch surface 820 and second grained notch touch surface 822 decreases the surface contact area between the door touch area and the first grained notch touch surface 820 and second grained notch touch surface 822. The roughening element may be introduced post-process, part of the tooling process, and/or during the molding process.

Figure 9:
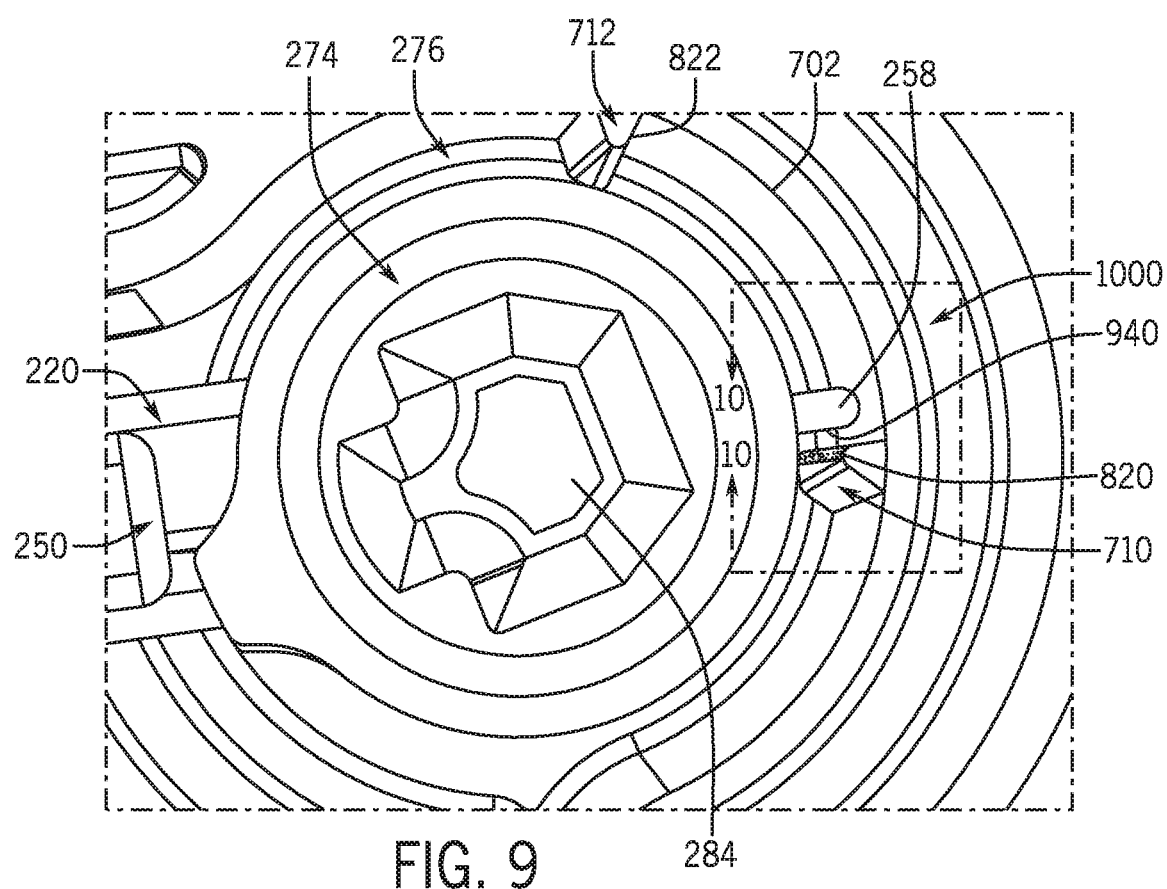
FIG. 9 is a side view of the portion of the HVAC case of FIG. 8 with the HVAC door of FIG. 2 installed within, according to an exemplary embodiment.
Figure 10:
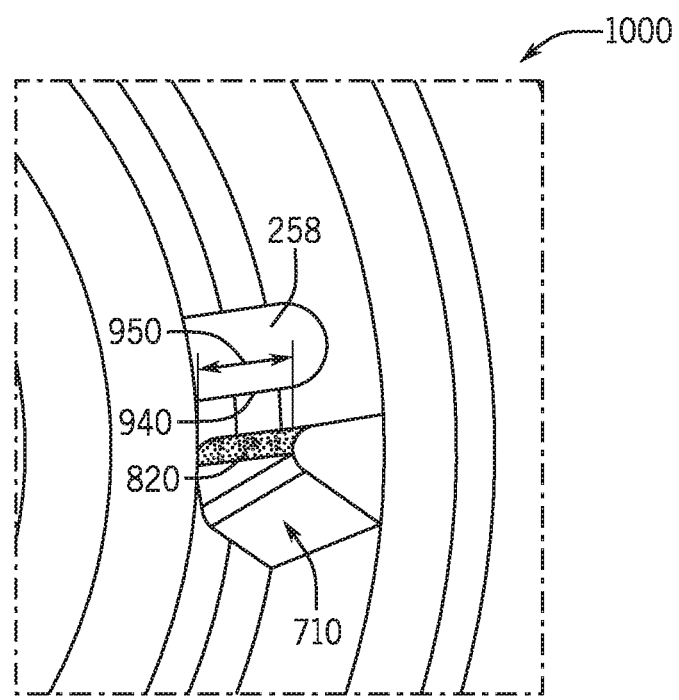
FIG. 10 is an enhanced view of the portion of the HVAC system of FIG. 9, according to an exemplary embodiment.

Referring to FIGS. 9 and 10, a cross-sectional view of the door 200 installed within the portion 700 of the case 102 is shown, according to an exemplary embodiment. The door 200 is in the open position, having transitioned from the closed position due to the rod portion 270 rotating clockwise (e.g., from the third end 216 toward the fourth end 218) within the first boss cavity 730 causing the fourth elastomer end 258 to be raised from the first grained notch touch surface 820. As shown in the portion 1000 of FIG. 10, when the door 200 is in the open position the rear door touch area 940 is not in contact with the first grained notch touch surface 820 and there is a separation distance along the surface contact area 950. In some embodiments, the case 102 has a zero degree draft on the over mold of the surface contact area 950.

Figure 11:
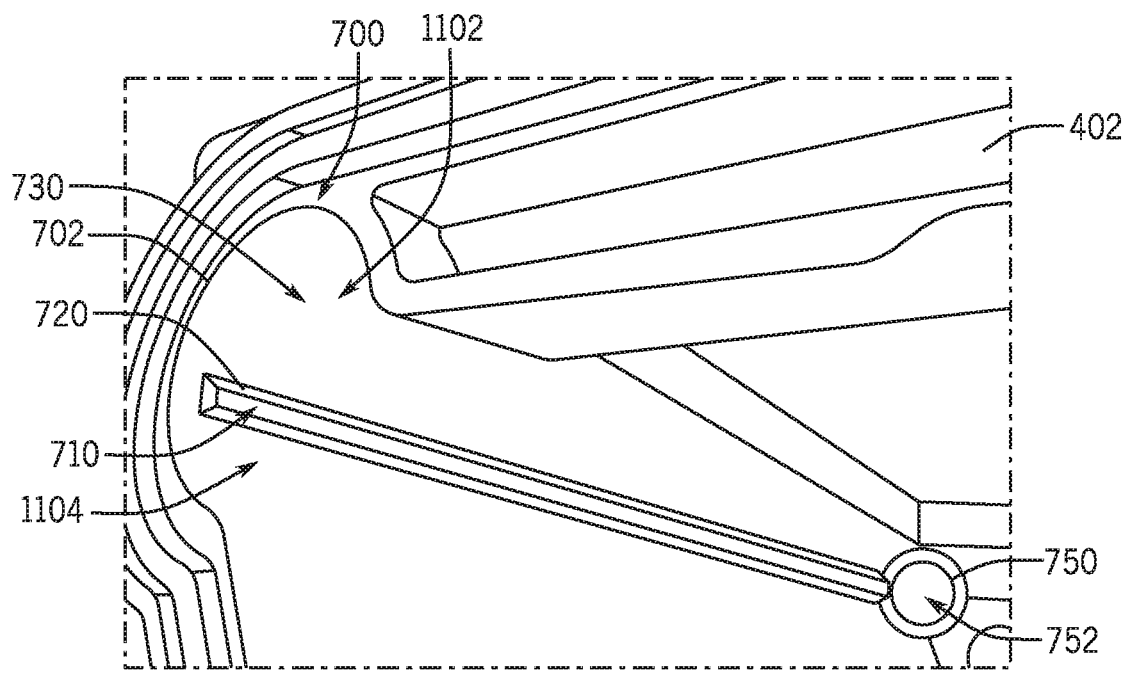
FIG. 11 is a cross-sectional view of the portion of the HVAC case of FIG. 7.
Figure 12:
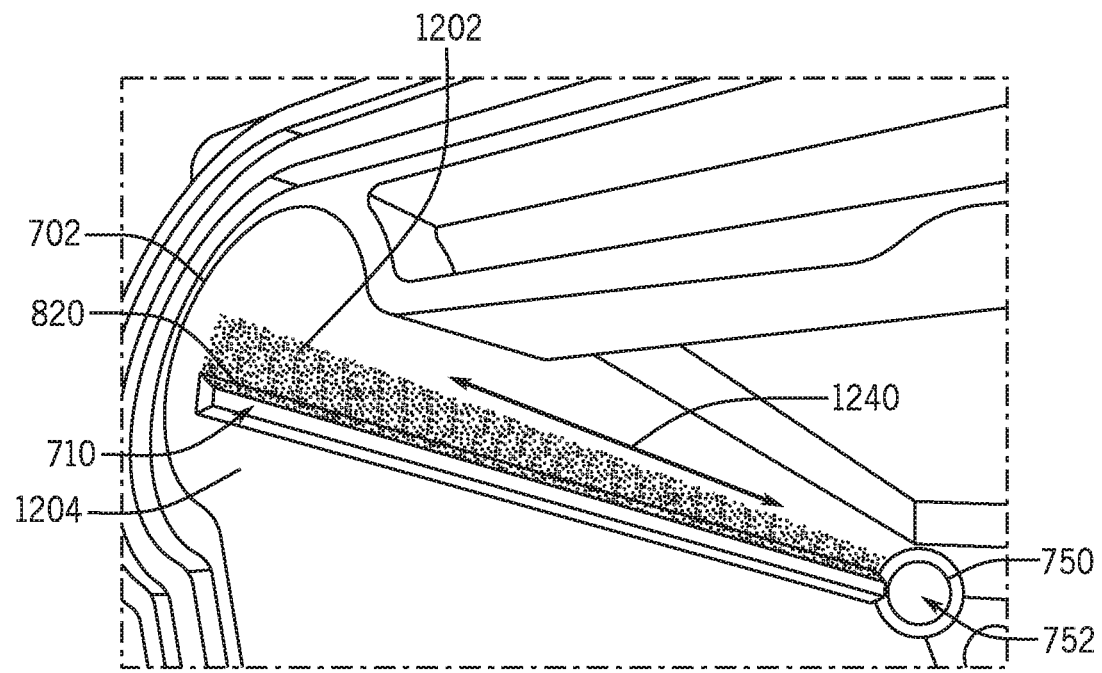
FIG. 12 is a cross-sectional view of the portion of the HVAC case of FIG. 7 with horizontal noise reducing surfaces, according to an exemplary embodiment.

FIG. 11 shows a perspective view of the portion 700 of the case 102 of FIG. 7. The second boss portion 750 is shown downstream of the first boss portion 704. The second boss portion 750 forms a boss cavity 752 configured to receive a second bore 284 of the rod portion 270 of a door, for example, the door 200 of FIGS. 2 and 3. The curved portion 702 includes the first notch 710 positioned between an upper curved portion 1102 and a lower curved portion 1104. Turning to FIG. 12, the first notch 710 and the upper curved portion 1102 are treated along the first notch touch surface 720 and the surface of the upper curved portion 1102 to alter the surface properties along a horizontal axis 1240 to form a first grained notch touch surface 820 and a grained surface upper curved portion 1202, respectively. In some embodiments, the lower curved portion is grained 1104 to form a grained surface lower curved portion 1204. The grains are done horizontally (e.g., along the horizontal axis 1240) along the first grained notch touch surface 820 and/or the grained surface upper curved portion 1202. For example, the roughening element may be applied along the first notch touch surface 720 in a horizontal direction (e.g., substantially parallel to the horizontal axis 1240). Graining the surface of the upper curved portion 1102, and in some embodiments the lower curved portion 1104, provides less stick with the front end, along the normal axis, of the elastomer 250. The grains may be formed by sanding the first notch 710 and/or upper curved portion 1102 with a roughening element having a particle size of 269 microns or 0.01014 inches horizontally along the first notch 710 and/or upper curved portion 1102 to form the first grained notch touch surface 820 and the grained surface upper curved portion 1202, respectively. In some embodiments, the grains may be formed by sanding a first notch 710 and/or upper curved portion 1102 with a roughening element having a particle size of 82 microns or 0.003091 inches horizontally along the first notch 710 and/or upper curved portion 1102 to form the first grained notch touch surface 820 and/or the grained surface upper curved portion 1202, respectively. In some embodiments, the roughening element may be sandpaper having a P60 grit or a P180 grit. The roughened first grained notch touch surface 820, the grained surface upper curved portion 1202, and, if grained, the grained surface lower curved portion 1204 decreases the surface contact area between the door touch area and the first grained notch touch surface 820, the grained surface upper curved portion 1202, and the grained surface lower curved portion 1204.

Figure 13:
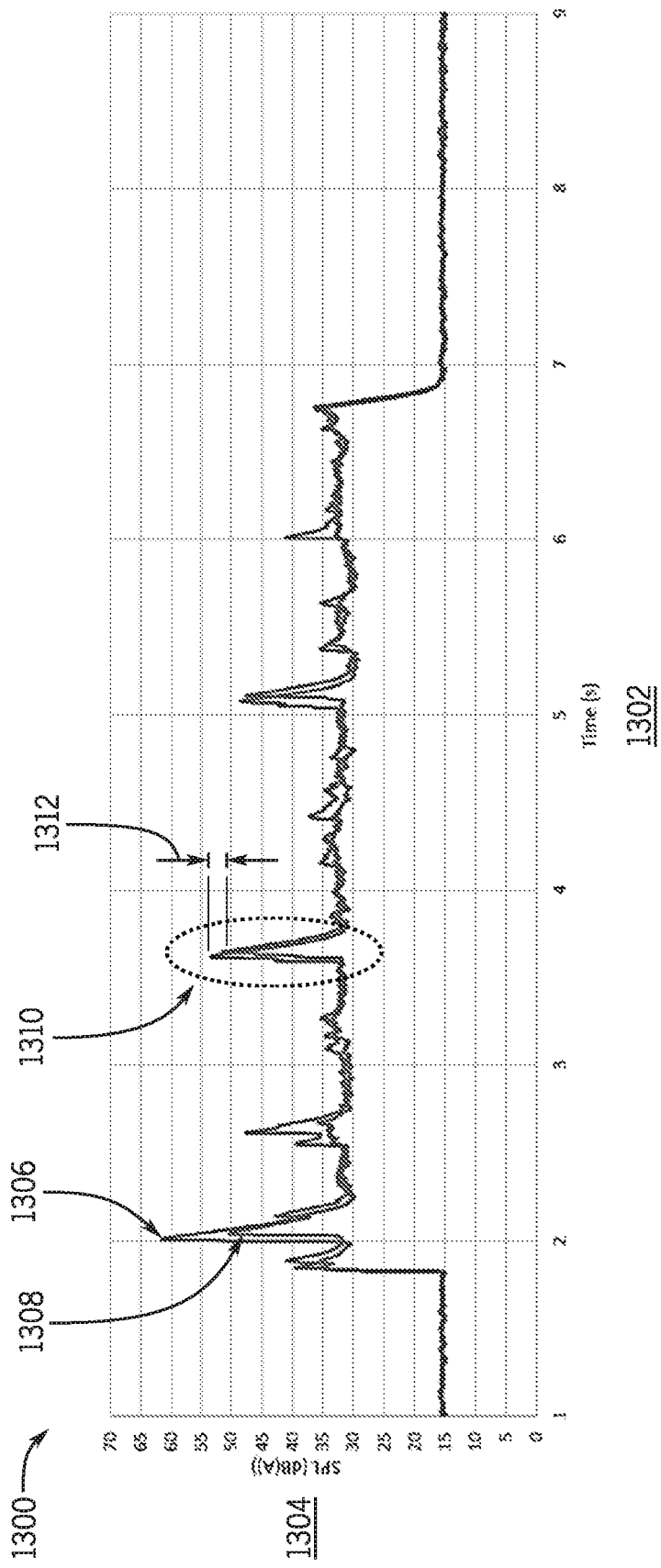
FIG. 13 is a graphical representation of a decibel difference between a baseline case and door configuration and a horizontally grained case and door configuration, according to an exemplary embodiment.

FIG. 13 shows a graphical representation 1300 of the decibel (dBA) 1304 difference between a baseline (e.g., no graining) case and door configuration 1306 and a horizontally grained case and door configuration 1308 over time (s) 1302. The testing conditions were completed by placing a microphone 200 mm away from the plurality of doors 210 and capturing the sound pressure level (SPL) with the microphone. The baseline case and door configuration 1306 may be similar to the portion 700 of the case 102 shown in FIG. 11. The horizontally grained case and door configuration 1308 may be similar to the portion 700 of the case 102 shown in FIG. 12. The pressure level in the horizontally grained case and door configuration 1308 has an improved noise reduction level 1312 compared to the baseline case and door configuration 1306. As shown in FIG. 13, at position 1310, there was a 1.9 dBA decrease in the sound pressure level in the horizontally grained case and door configuration 1308 compared to the baseline case and door configuration 1306. Notably, the at 2 second and 6 seconds there was approximately a 10 dBA decrease in the sound pressure level in the horizontally grained case and door configuration 1308 compared to the baseline case and door configuration 1306.

Figure 14:
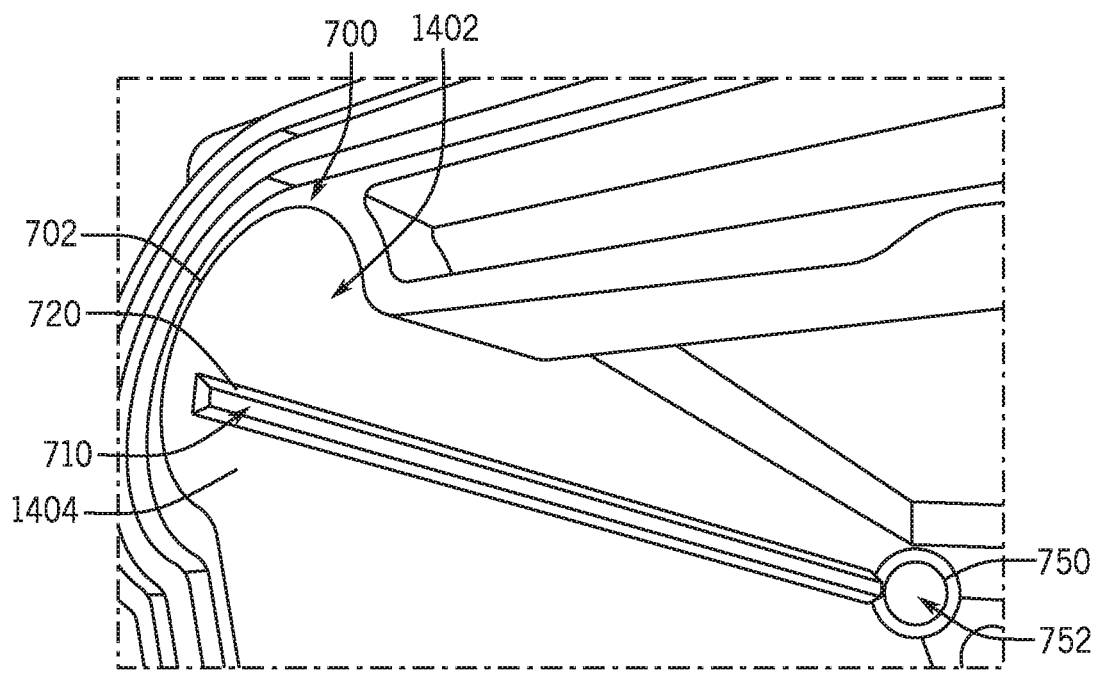
FIG. 14 is a cross-sectional view of the portion of the HVAC case of FIG. 7.
Figure 15:
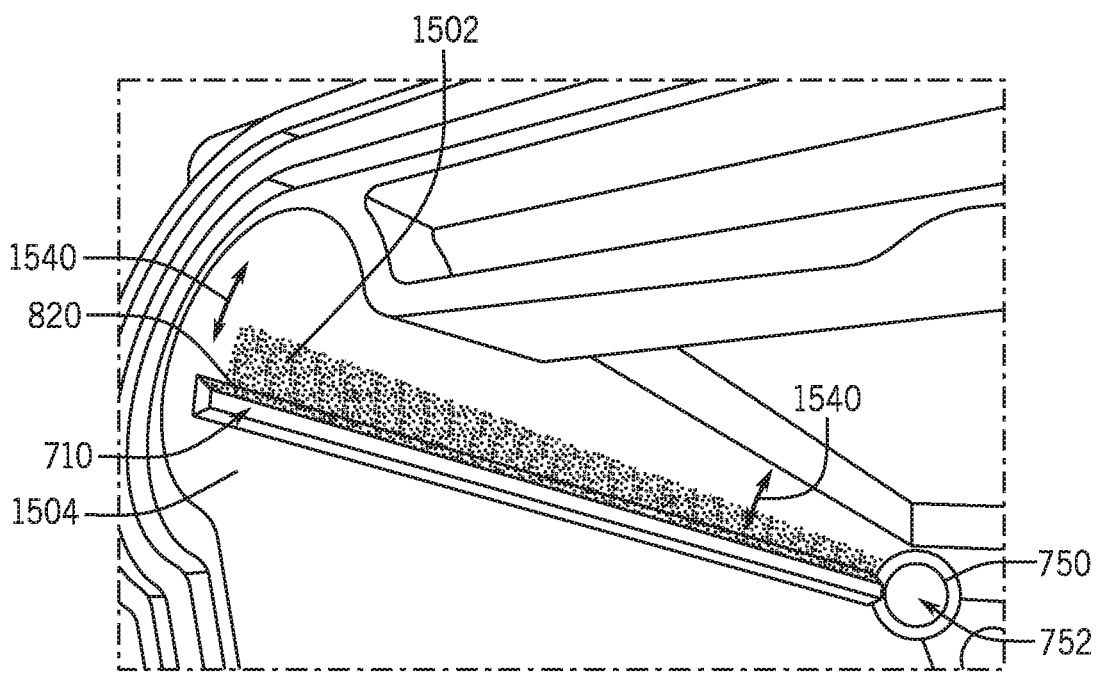
FIG. 15 is a cross-sectional view of the portion of the HVAC case of FIG. 7 with vertical noise reducing surfaces, according to an exemplary embodiment.

FIG. 14 shows a perspective view of the portion 700 of the case 102 of FIG. 7. The second boss portion 750 is shown downstream of the first boss portion 704. The second boss portion 750 forms a boss cavity 752 configured to receive a second bore 284 of the rod portion 270 of a door, for example, the door 200 of FIGS. 2 and 3. The curved portion 702 includes the first notch 710 positioned between an upper curved portion 1402 and a lower curved portion 1404. Turning to FIG. 15, the first notch 710 and the upper curved portion 1402 are treated along the first notch touch surface 720 and the surface of the upper curved portion 1402 to alter the surface properties along a vertical axis 1540 to form a first grained notch touch surface 820 and a grained surface upper curved portion 1502, respectively. In some embodiments, the lower curved portion is grained 1404 to form a grained surface lower curved portion 1504. The grains are done vertically (e.g., along the vertical axis 1540) along the first grained notch touch surface 820 and/or the grained surface upper curved portion 1502. For example, the roughening element may be applied along the first notch touch surface 720 in a vertical direction (e.g., substantially parallel to the vertical axis 1540). Graining the surface of the upper curved portion 1402, and in some embodiments the lower curved portion 1404, provides less stick with the front end, along the normal axis, of the elastomer 250. The grains may be formed by sanding the first notch 710 and/or upper curved portion 1402 with a roughening element having a particle size of 269 microns or 0.01014 inches vertically along the first notch 710 and/or upper curved portion 1402 to form the first grained notch touch surface 820 and the grained surface upper curved portion 1502, respectively. In some embodiments, the grains may be formed by sanding a first notch 710 and/or upper curved portion 1402 with a roughening element having a particle size of 82 microns or 0.003091 inches vertically along the first notch 710 and/or upper curved portion 1402 to form the first grained notch touch surface 820 and/or the grained surface upper curved portion 1502, respectively. In some embodiments, the roughening element may be sandpaper having a P60 grit or a P180 grit. The roughened first grained notch touch surface 820, the grained surface upper curved portion 1502, and, if grained, the grained surface lower curved portion 1504 decreases the surface contact area between the door touch area, the first grained notch touch surface 820 and/or the grained surface upper curved portion 1502, and the grained surface lower curved portion 1504.

Figure 16:
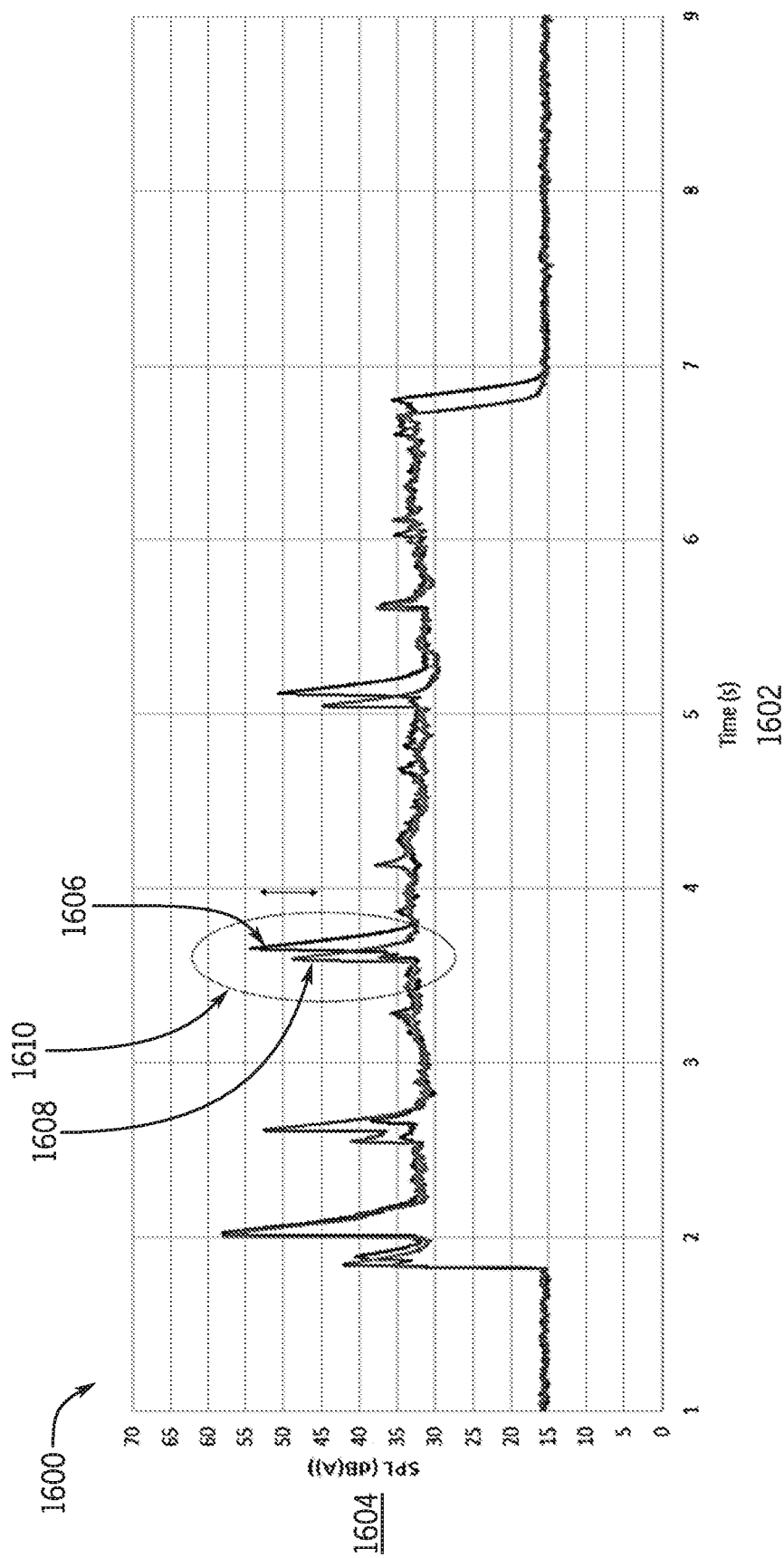
FIG. 16 is a graphical representation of a decibel difference between a baseline case and door configuration and a vertically grained case and door configuration, according to an exemplary embodiment.

FIG. 16 shows a graphical representation 1600 of the decibel (dBA) 1704 difference between a baseline (e.g., no graining) case and door configuration 1606 and a vertically grained case and door configuration 1608 over time (s) 1302. The testing conditions were completed by placing a microphone 200 mm away from the plurality of doors 210 and capturing the sound pressure level (SPL) with the microphone. The baseline case and door configuration 1606 may be similar to the portion 700 of the case 102 shown in FIG. 14. The pressure level in the vertically grained case and door configuration 1608 has an improved noise reduction level 1612 compared to the baseline case and door configuration 1606. The vertically grained case and door configuration 1308 may be similar to the portion 700 of the case 102 shown in FIG. 15. As shown in FIG. 16, at position 1610, there was a 5 dBA decrease in the sound pressure level in the vertically grained case and door configuration 1608 compared to the baseline case and door configuration 1606. Notably, the at 2.5 second and 5 seconds there was approximately a 15 dBA decrease in the sound pressure level in the vertically grained case and door configuration 1608 compared to the baseline case and door configuration 1606.

Figure 17:
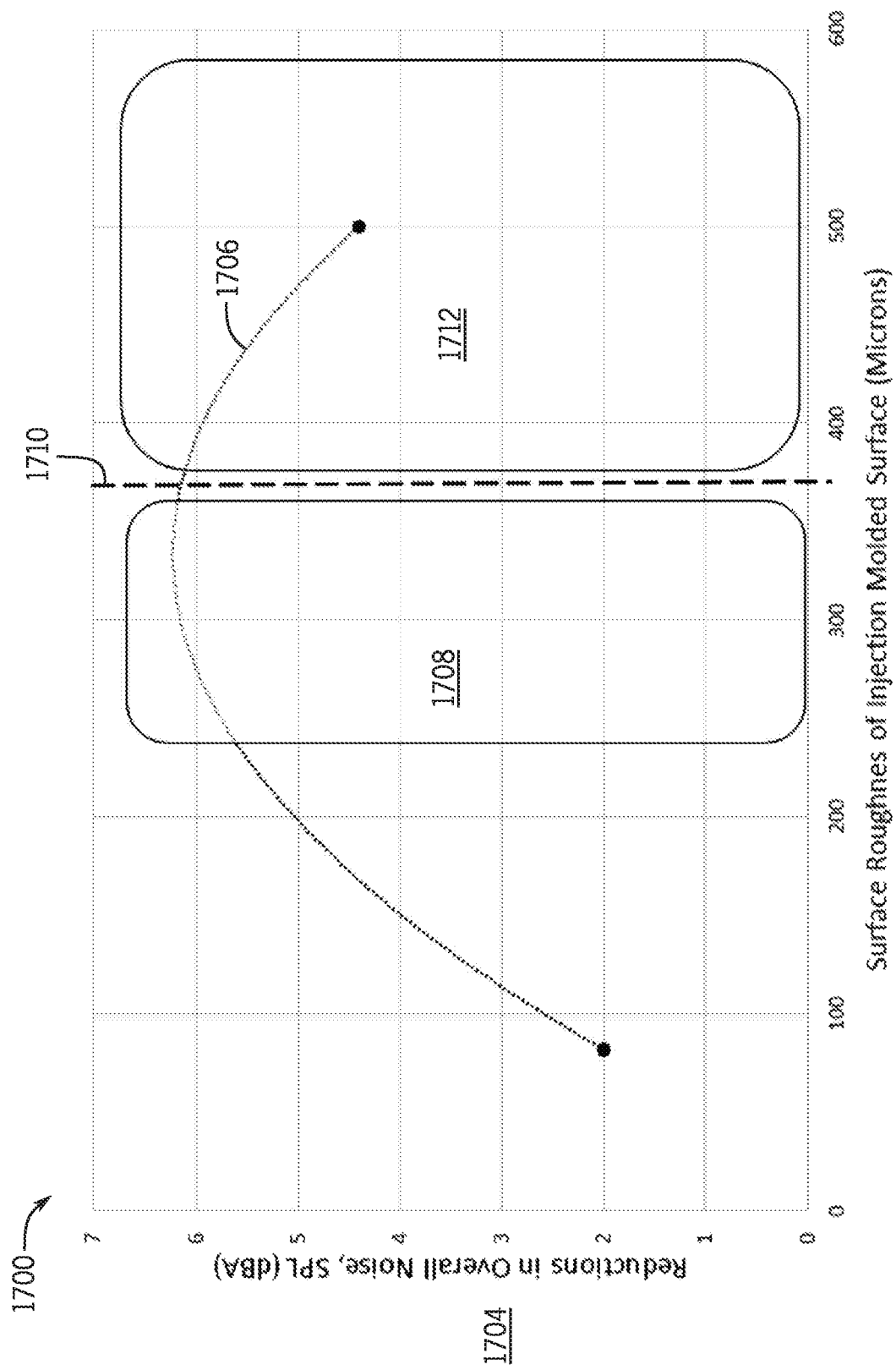
FIG. 17 is a graphical representation of a reduction in overall sound pressure level with a material having a 35 Shore hardness, according to an exemplary embodiment.

FIG. 17 is a graphical representation 1700 of a reduction in overall sound pressure level (e.g., noise) 1704 with a door having a 35 Shore hardness as the surface roughness (microns) 1702 of the case 102 increases, according to an exemplary embodiment. An ideal range 1708 exists as the surface roughness 1702 is between 250 and 300 microns and results in a reduction in overall noise of greater than 5 dBA. A limit 1710 exists as a result of air tightness for which an increase in the surface roughness 1702 greater than 350 microns results in a non-ideal range 1712. In other words, there is an "air sealing limit" such that an increase in surface roughness reduces the efficacy of the seal formed between the door and case when the door is in the closed position.

The noise reducing surface, of which various exemplary embodiments are disclosed herein, provides several advantages over surfaces in existing HVAC systems. The noise reducing surface may be implemented along a touch area of a door, a touch area of the case, or both touch areas to reduce the coefficient of friction (compared to a smooth case touch area and door touch area) along the surface contact area of the touch area of a door and the touch area of the case. The noise reducing surface is configured to reduce the noise of the door moving from the closed position to the open position by more than 5 dBA, while maintain a seal between the door and the case that restricts any air leakage to the other side when the door is in the closed position. The noise reducing surface includes a surface roughness between 100 to 300 microns. The grains along the grained touch area may be horizontal, vertical, or a combination of parallel and non-parallel grains. The grains may be formed by sanding a touch area with a roughening element having a particle size of 269 microns or 0.01014 inches along the touch area to form the grained touch area. Additionally, the noise reducing surface, occupies nearly the same volume as a traditional surface, which allows the noise reducing surface, to be utilized in a larger variety of applications when compared to alternatives.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other illustrative embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various illustrative embodiments without departing from the scope of the present invention.

What is claimed is:

1. A heating, ventilation, and air conditioning ("HVAC") system comprising:
   a door having a first end and a second end, the door comprising an elastomer along the first end and a rotatable member adjacent the second end, the elastomer comprising a door touch area; and a case defining an internal case portion, an external case portion, and a case opening fluidly connecting the internal case portion and the external case portion, the case configured to receive the rotatable member of the door such that the door is rotatable about an axis between a first position where the door covers the case opening and a second position where the door does not cover the case opening, the case comprising a case touch area with a graining, wherein the door touch area and the case touch area are substantially parallel and in contact along a surface contact area when the door is in the first position, wherein the case further comprises a curved surface disposed adjacent to the case touch area, and wherein a portion of the curved surface has graining to form a grained curved portion, the graining reducing contact between the grained curved portion and the elastomer.

2. The HVAC system of claim 1, wherein the case touch area has graining to form a grained case touch area, the graining reducing contact between the grained case touch area and the door touch area along the surface contact area.

3. The HVAC system of claim 2, wherein a first force that is required to separate the grained touch area and the door touch area as the door rotates about the axis from the first position toward the second position is less than a second force that is required to separate an ungrained touch area and the door touch area as the door rotates about the axis from the first position toward the second position.

4. The HVAC system of claim 2, wherein the case touch area has graining in a horizontal direction.

5. The HVAC system of claim 2, wherein the case touch area has graining in a vertical direction.

6. The HVAC system of claim 1, wherein the case touch area has graining, the graining resulting in a first coefficient of friction between the case touch area and the door touch area along the surface contact area when the door transitions from the first position to the second position, wherein the first coefficient of friction is reduced compared to a second coefficient of friction between an ungrained case touch area and the door touch area along the surface contact area when the door transitions from the first position to the second position.

7. The HVAC system of claim 1, wherein in the first position, a seal is formed between the door and the case restricting air leakage from internal case portion to the external case portion through the case opening.

8. The HVAC system of claim 7, wherein the case touch area has graining forming a grained case touch area, wherein the graining increases surface roughness of the grained case touch area compared to the ungrained case touch area, wherein the surface roughness maintains efficacy of the seal.

9. The HVAC system of claim 1, wherein the elastomer comprises a first edge and a second edge spaced inwardly from the first edge toward the rotatable member, wherein at least one of the first edge and the second edge extends axially, wherein the door touch area extends from the first edge toward the second edge, wherein the door touch area has graining to form a grained door touch area, the graining reducing contact between the grained door touch area and the case touch area along the surface contact area.

10. A heating, ventilation, and air conditioning ("HVAC") system comprising:
an HVAC case defining a case opening and a case touch area adjacent the case opening; and
at least one door disposed in the HVAC case, the at least one door being rotatable between a first position in which the at least one door covers the case opening and a second position in which the at least one door does not cover the case opening, the at least one door comprising:
an elastomer defining an first end and a second end, the elastomer comprising a door touch area extending from the first end to the second end;
wherein the elastomer is angled from the first end toward the second end, wherein the door touch area contacts the case touch area along a surface contact area when the at least one door is in the first position, wherein the HVAC case further comprises a curved surface disposed adjacent to the case touch area, and wherein a portion of the curved surface has graining to form a grained curved portion, the graining reducing contact between the grained curved portion and the elastomer.

11. The HVAC system of claim 10, wherein the case touch area has graining to form a grained case touch area, the graining reducing contact between the grained case touch area and the door touch area along the surface contact area.

12. The HVAC system of claim 11, wherein a first force that is required to separate the grained touch area and the door touch area as the door rotates from the first position toward the second position is less than a second force that is required to separate an ungrained touch area and the door touch area as the door rotates from the first position toward the second position.

13. The HVAC system of claim 11, wherein the case touch area has graining in a horizontal direction.

14. The HVAC system of claim 10, wherein the door further comprises a rotatable member, wherein the door touch area extends parallel to the rotatable member, wherein the elastomer is angled with respect to a rotational axis of the door.

15. The HVAC system of claim 10, wherein the case touch area has graining, the graining resulting in a first coefficient of friction between the case touch area and the door touch area along the surface contact area when the door transitions from the first position to the second position, wherein the first coefficient of friction is reduced compared to a second coefficient of friction between an ungrained case touch area and the door touch area along the surface contact area when the door transitions from the first position to the second position.

16. The HVAC system of claim 10, wherein in the first position, a seal is formed between the door and the case obstructing air leakage from internal case portion to the external case portion through the case opening.

17. The HVAC system of claim 16, wherein the case touch area has graining forming a grained case touch area, wherein the graining increases surface roughness of the grained case touch area compared to the ungrained case touch area, wherein the surface roughness maintains efficacy of the seal.

18. The HVAC system of claim 10, wherein the case touch area is substantially parallel to the door touch area when the door is in the first position.

19. The HVAC system of claim 10, wherein the elastomer comprises a first edge and a second edge spaced inwardly from the first edge toward the rotatable member, wherein at least one of the first edge and the second edge extends axially, wherein the door touch area extends from the first edge toward the second edge, wherein the door touch area has graining to form a grained door touch area, the graining reducing contact between the grained door touch area and the case touch area along the surface contact area.

* * * * *